(12) United States Patent
Muraishi

(10) Patent No.: US 6,311,407 B1
(45) Date of Patent: Nov. 6, 2001

(54) PICTURE HANGING AID

(76) Inventor: Noboru Muraishi, P.O. Box 460543, Glendale, CO (US) 80246

( * ) Notice: Subject to any disclaimer, the term of this patent is extended or adjusted under 35 U.S.C. 154(b) by 0 days.

(21) Appl. No.: 09/426,687

(22) Filed: Oct. 25, 1999

(51) Int. Cl.$^7$ ............................. G01D 21/00; G01C 15/10
(52) U.S. Cl. ................................................. 33/613; 33/392
(58) Field of Search .......................... 33/613, 347, 365, 33/391, 392, 393, 394, 404, 407, 408, 413, 645

(56) References Cited

U.S. PATENT DOCUMENTS

| | | | |
|---|---|---|---|
| 461,757 | * | 10/1891 | Huxtable ................................. 33/393 |
| 934,531 | * | 9/1909 | Hover et al. ............................ 33/613 |
| 2,422,358 | * | 6/1947 | Lobl ........................................ 33/392 |
| 2,627,124 | * | 2/1953 | Rock ....................................... 33/392 |
| 3,309,089 | * | 3/1967 | Doyle ..................................... 33/393 |
| 3,866,329 | * | 2/1975 | West ....................................... 33/392 |
| 4,382,337 | * | 5/1983 | Bendick ................................. 33/613 |
| 5,195,248 | * | 3/1993 | Juhasz .................................... 33/347 |
| 5,974,676 | * | 11/1999 | Beall et al. ............................. 33/392 |

\* cited by examiner

*Primary Examiner*—Christopher W. Fulton
(74) *Attorney, Agent, or Firm*—Thomas W. Hanson

(57) ABSTRACT

A dual purpose picture hanging aid which serves as both a device for holding the picture wire in position away from the back of the picture and as an adjustable length plumb bob for straightening the picture after hanging. The device incorporates openings for receiving the plumb bob string as it is wound around the body and a hook for engaging the string in a partially wound position, providing the adjustable length. Notches in the outer edge engage the picture wire allowing the device to be wedged between the wire and the picture. A smoothly curving edge opposite the edges allows the device to be easily removed after hanging the picture.

8 Claims, 6 Drawing Sheets

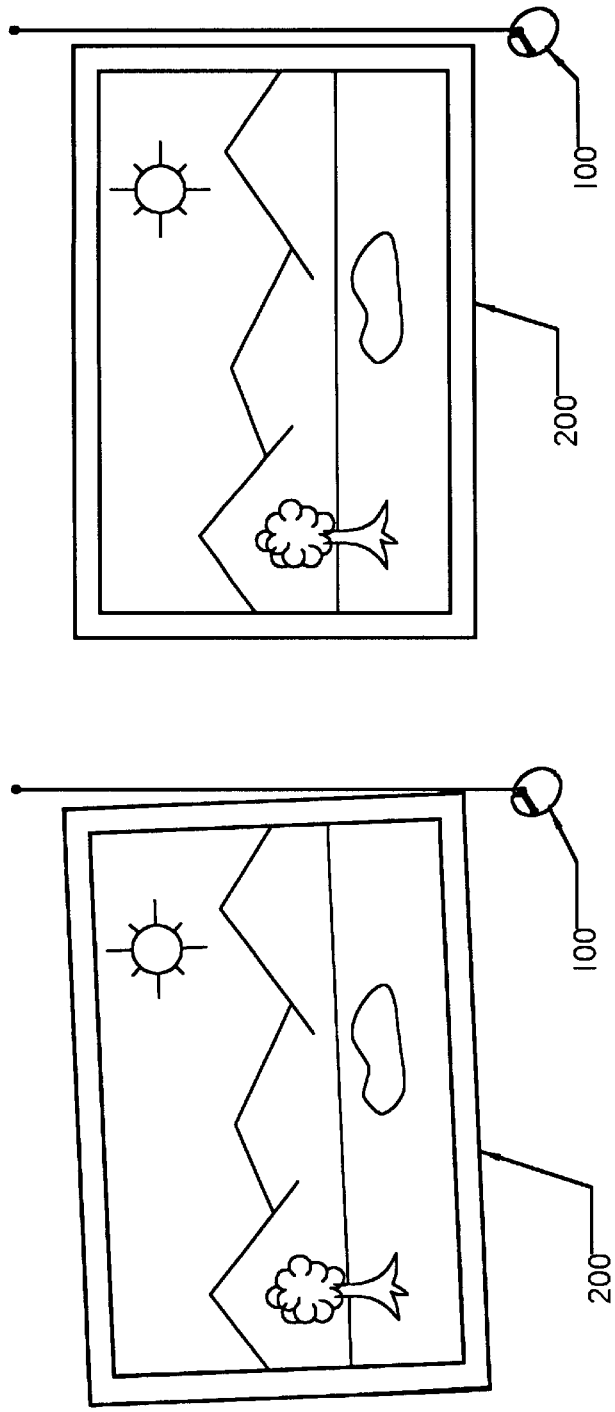

PICTURE HANGING AID

FIELD OF THE INVENTION

The present invention relates to aids for hanging pictures. More specifically it performs two functions: it holds the wire out from the back of the picture to ease placing the wire over the hook or nail in the wall; and it acts as an adjustable length plumb bob for straightening the picture after hanging.

BACKGROUND OF THE INVENTION

Hanging a picture on the wall is a task familiar to most people. Equally familiar is the frustration of trying to slip the limp picture wire into the hook on the wall and then straightening the picture when it is finally hung.

A variety of devices have been invented to assist with placing the wire over the hook. Typical is a rigid hook which can be used to reach down behind the picture, pull up on the picture wire, and slip the wire into the hook. While effective for small pictures, it is inconvenient for larger pictures because only one hand is available to hold the picture. Further, the person hanging the picture must be able to reach over the top of the picture to use this type of device which may not be possible when the picture is being hung above eye level.

Once the picture is hung, it must be straightened. Many people will do so visually. Others will use a spirit level if one is available. A conventional plumb bob is also applicable to verify that one edge of the picture is vertical. Spirit levels and plumb bobs, while effective, are also relatively expensive, especially where the person only expects to hang one or two pictures. The plumb bob is also typically designed for use with the full length of attached string, or cord, unrolled and hanging free. Where a small picture is being hung, the excess cord may exceed the amount is use by many times. This excess cord may hang free, becoming tangled or interfering with the visual comparison of the straight point of the cord and the picture frame. Further, conventional plumb bobs are relatively heavy, to assure that the cord is straight. Where it is desired to support the plumb bob by attaching it to the wall (as where one person is hanging the picture and needs to step back to view the relationship) it may be necessary to use a relatively large item, such as a nail to support the plumb bob. This would typically leave a visible mark in the wall.

There is a need for a device to assist in the hanging and straightening of picture. This device should hold the picture wire in position away from the back of the picture and leave both hands free for supporting and maneuvering the picture. It should work with a variety of picture sizes. As a plumb bob, the device should provide an adjustable length string and should be relatively light in weight so that it can be hung from a small pin or tack, leaving a relatively small mark on the wall. This device should be easily and inexpensively manufactured so that it can be sold to the consumer at a fraction of the cost of the picture being hung. If it can be sold for only a few dollars, it would become a viable option for a person purchasing even the least expensive picture or poster.

SUMMARY OF THE INVENTION

The present invention is directed to an apparatus which serves to position a picture wire for easy placement over the supporting hook, or nail, and then serves as an adjustable length plumb bob to straighten the picture.

According to the invention there is provided a substantially flat body with a continuously curving edge; a string attached to the body; openings in the edges of the body in which the string can be wound; and a hook which engages the string in a partially unwound position providing for an adjustable length of string.

According to an aspect of the invention the hook is provided by shaping one of the openings for winding the string into a curved shape which prevents the string from slipping out when the device is hanging freely.

According to another aspect of the invention one or more notches are provided which are designed to engage the picture wire when the device is inserted between the wire and the picture, thus holding the wire away from the back of the picture, under slight tension. In the preferred embodiment, the body of the device is an oval and the notches are placed one at an end of the major axis and one at an end of the mirror axis. This provides two distinctly different dimensions across the body of the device to accommodate different picture sizes.

Further in accordance with the invention some method of attaching the loose end of the string to the wall upon which the picture is being hung may be provided. This may be a tack, pushpin, magnet, removable adhesive, or any other means of temporarily attaching the string to a wall. There may also be some means of attaching this tack, or other mechanism, to the body of the device for storage.

The advantages of such an apparatus are that a single item serves two functions commonly needed in hanging a picture: holding the wire and straightening the picture. The device is inexpensive to manufacture and sell, is lightweight, self storing, and adapts to variety of picture sizes in both of its roles.

The above and other features and advantages of the present invention will become more clear from the detailed description of a specific illustrative embodiment thereof, presented below in conjunction with the accompanying drawings.

BRIEF DESCRIPTION OF THE DRAWINGS

FIG. 11 illustrates the device in use as a plumb bob, where the picture is tilted.

FIG. 12 illustrates the device in use as a plumb bob, where the picture has been straightened.

FIG. 13 shows the device is use as a plumb bob with a smaller picture illustrating the adjustable length feature.

DETAILED DESCRIPTION OF THE INVENTION

The following discussion focuses on the preferred embodiment of the invention, in which an oval body incorporates the features of the invention. However, as will be recognized by those skilled in the art, the disclosed device is applicable to a variety of implementations.

The following is a brief glossary of terms used herein. The supplied definitions are applicable throughout this specification and the claims unless the term is clearly used in another manner.

Body—the main structure of the invention about which the string is wound and which serves as a weight.

String—essentially any elongated member capable of being wrapped around the body of the invention and, when unrolled, of hanging essentially straight when supporting the weight of the body. Candidates include, but are not limited to: cotton string, thread, fishing line, braided or twisted cord.

Picture—generally the item being hung. This could be a painting, photograph, poster, or any other item which is hung on a hook or nail on a wall or other substantially flat surface.

Picture wire—the wire, or other material, which is attached to the back of a picture and which is placed over a hook, nail, or other supporting device, to hang the picture.

PREFERRED EMBODIMENT

The disclosed invention is described below with reference to the accompanying figures in which like reference numbers designate like parts.

The present invention is a dual purpose aid for hanging pictures. In its first role ("picture hanger"), it holds the picture wire away from the back of the picture, under slight tension, to ease the task of placing the wire over the hook on the wall. In its second role ("plumb bob"), it functions as an adjustable length plumb bob to assist in straightening a picture after it has been hung.

Figure 1:
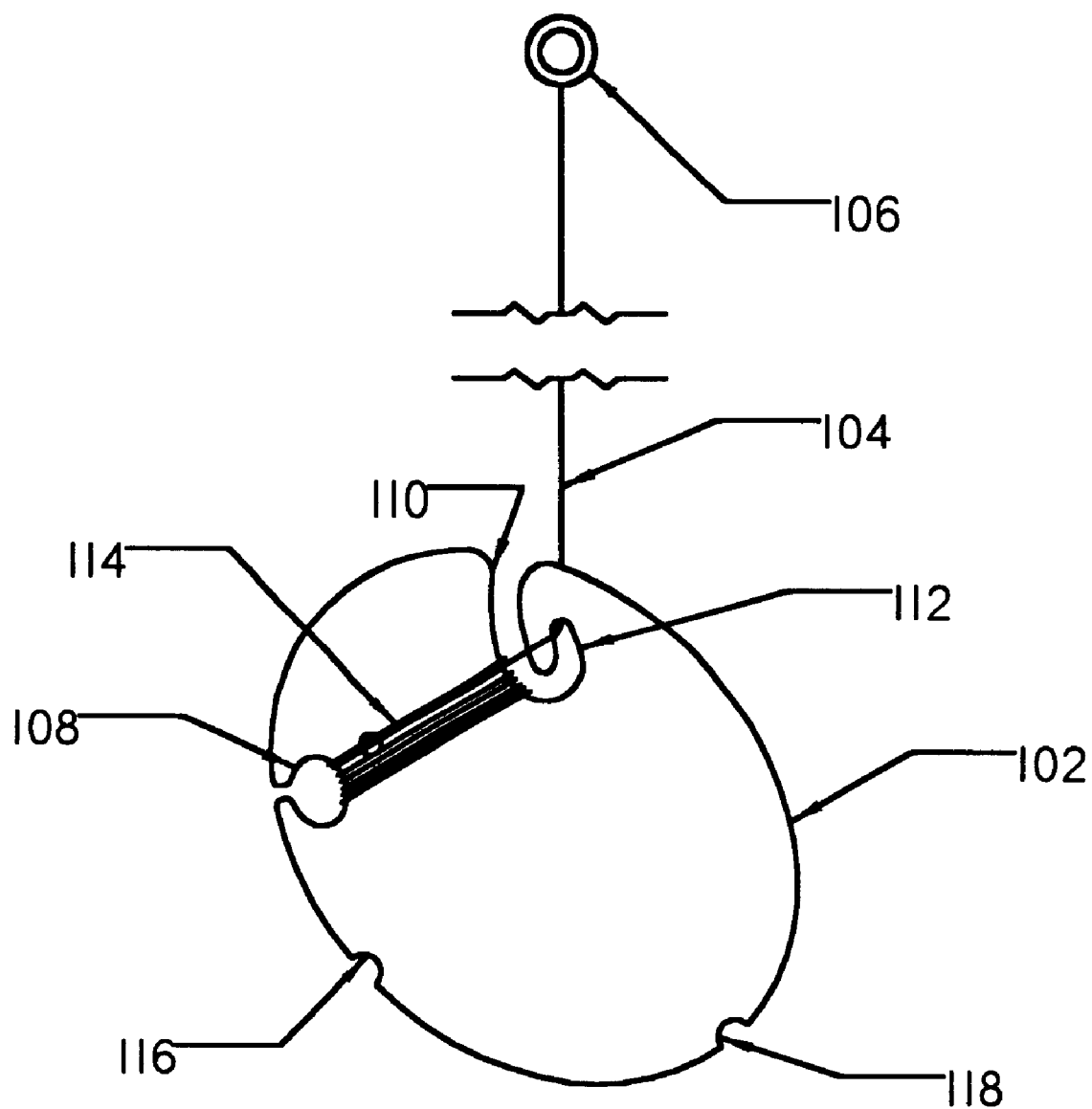
FIG. 1 illustrates the preferred embodiment of the invention.

The features of the invention can be seen generally in FIG. 1. The invention comprises a substantially flat body, 102, a string, 104, from which the body can be suspended, and an optional tack or pushpin, 106, for attaching the string to the wall adjacent the picture. The novel configuration of the body enables much of the functionality of the invention. Openings, 108 and 110, provide for storage of the string by winding it around the body when not in use. Opening 110 is further configured to form a hook, 112, which can engage the string as it passes out of the opening, providing adjustable length for the free portion of the string. Notches, 116 and 118, serve to engage the picture wire when the device is used as a picture hanger. The curved edges opposite the notches assist in the removal of the device after the picture has been hung. These features and others will be discussed in more detail below with respect to the different roles of the invention.

Figures 2, 3, 4:
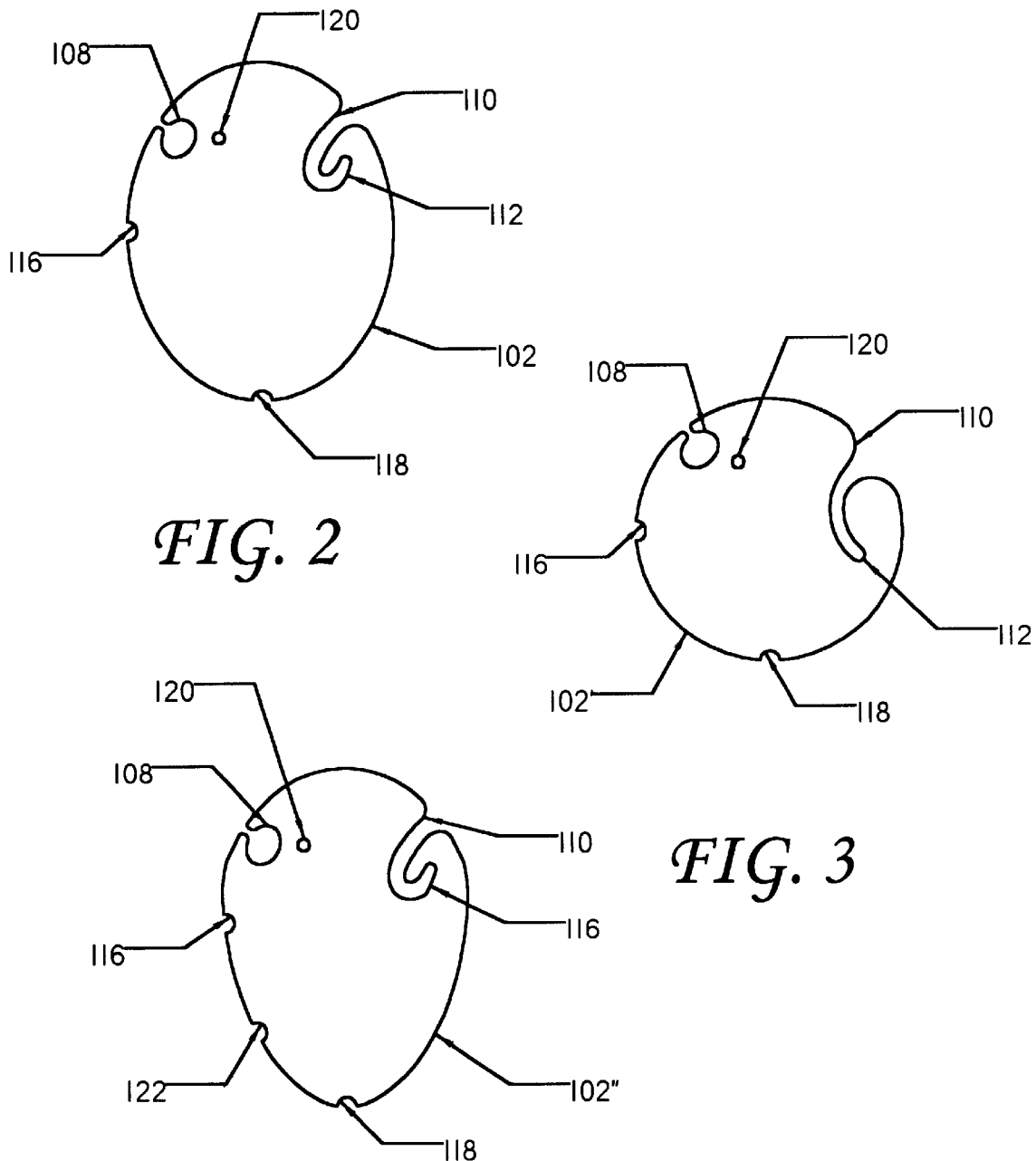
FIG. 2 provides a more detailed view of the preferred form of the body of the invention.
FIG. 3 illustrates an alternative form of the body of the invention.
FIG. 4 illustrate another alternative form of the body of the invention.
Figures 5A, 5B, 6:
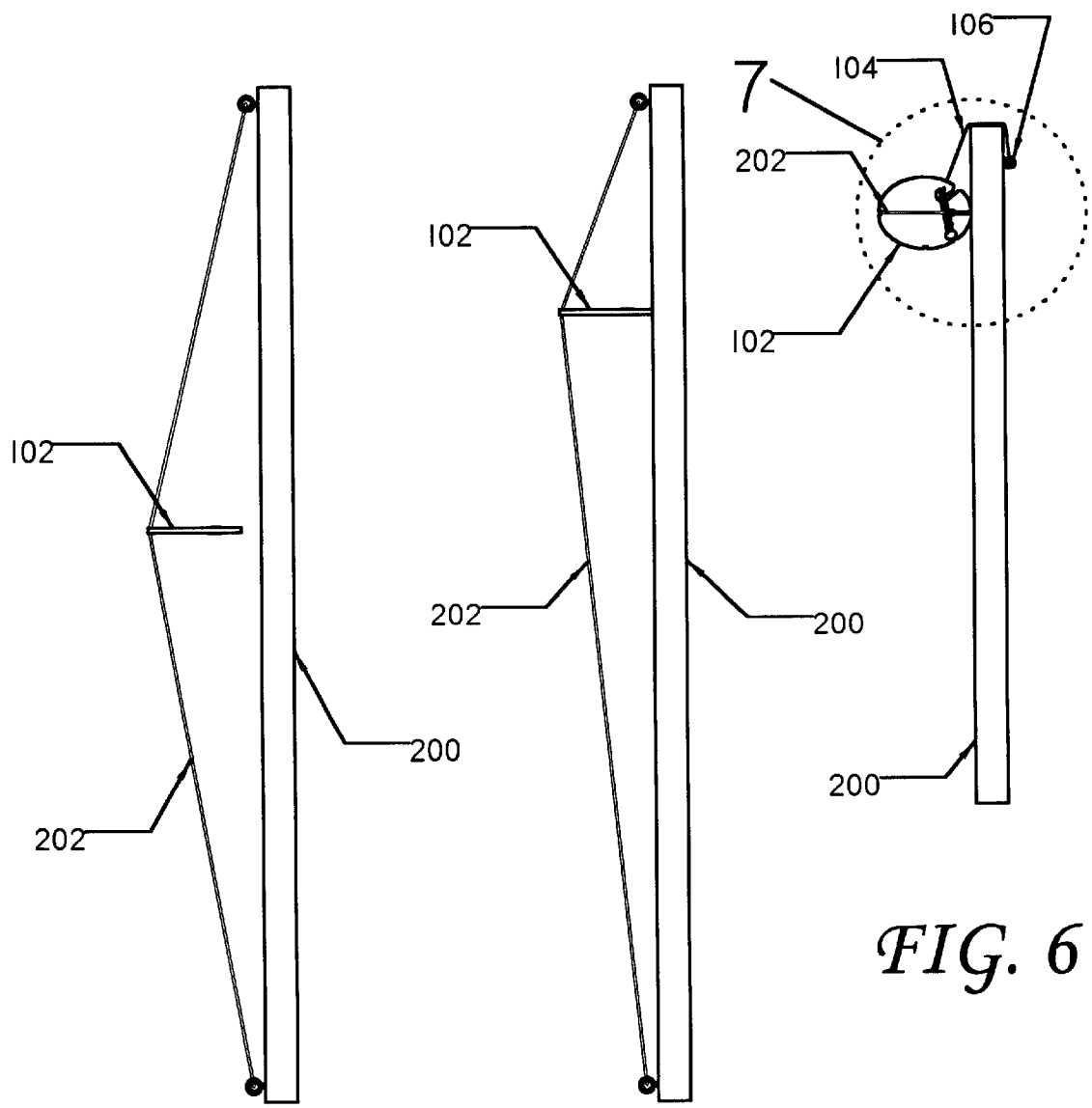
FIG. 5A illustrates the device in use holding the picture wire as it would be initially positioned, view from the top.
FIG. 5B illustrates the device in use holding the picture wire as it would be positioned to tension the wire, viewed from the top.
FIG. 6 provides a side view of the device in use holding the picture wire.

FIGS. 2–4 illustrate alternative embodiments of the body of the present invention. FIG. 2 represents the preferred configuration of the body, providing two different dimensions relative to the notches. (The relevance of this will be discussed below.) FIG. 3 illustrates a circular form which provides only a single dimension, thus limiting the options, but which would still function for a wide range of picture dimensions. This configuration could also use only a single notch. Also illustrated is an alternative form of the opening, 110, and hook, 112. FIG. 4 increases the number of options by adding a third notch, 122, and providing an "egg shape" with a steadily increasing lateral dimension. The trade off is that the device may be more difficult to remove and may not stay in place as well. This approach could clearly be extended by providing further additional notches.

PICTURE HANGER ROLE

FIGS. 5–8 illustrate the use of the present invention as a picture hanger aid. The device holds the picture wire, 202, away from the back side of the picture, 200, and under slight tension greatly easing the task of placing the wire over the hook, or nail, on the wall.

Figure 7:
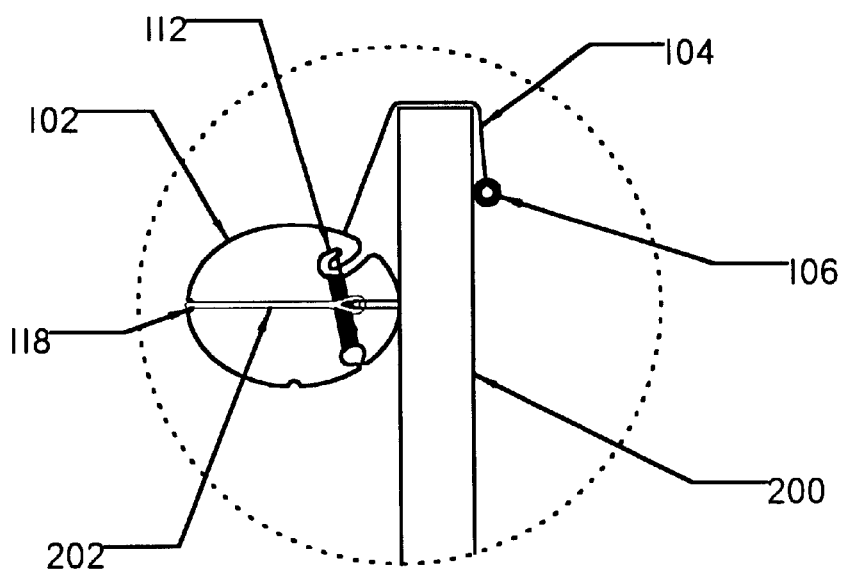
FIG. 7 is a detailed view of the device in the same position as FIG. 6.

With reference to FIG. 7 it can be seen that the notch, 118, has been positioned to engage the picture wire, 202. This prevents the wire from slipping off of the device prematurely. As discussed below, either notch may be used. In use, the device will be positioned approximately horizontal with the end opposite the selected notch toward the back of the picture. The device will initially be positioned near the middle of the picture wire, FIG. 5A, where it is easily inserted between the wire and the picture, and then slid toward one end of the picture, FIG. 5B. As the device approaches end of the wire, the wire will tighten, pulling the device toward, and into contact with, the back of the picture. Preferably the device is oriented with the hook, 112, upward and toward the picture and the device substantially horizontal. Also preferably, a portion of the string will be unwound, passed through the hook, and draped over the top of the picture. This is not critical to the operation of the device, but eases retrieval of the string for removal. If used, the tack, 106, serves as a weight to maintain the string in position. The device tolerates a significant positional variation from the horizontal. With wide deviation, the device may become difficult to remove in one direction (see below) but can still be removed in the other.

Figure 8:
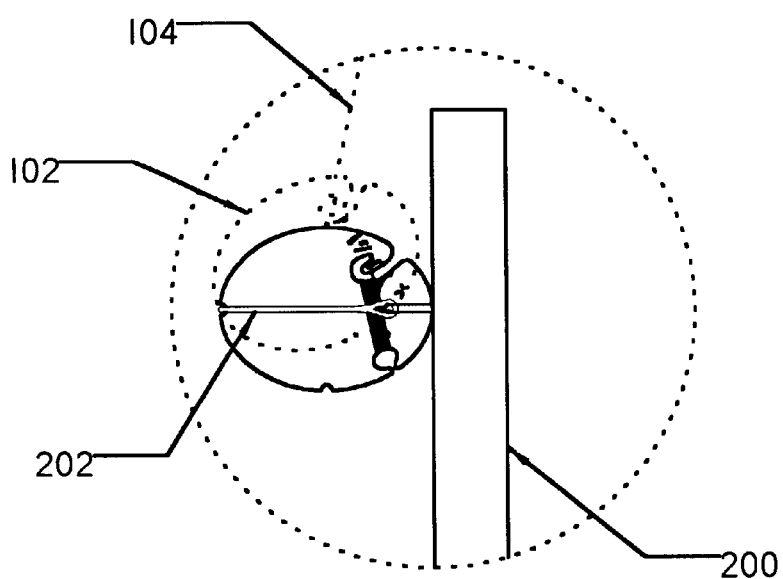
FIG. 8 illustrates the device being removed by pulling upward on the string.

With the device held in place by the tension of the picture wire, the wire can now be easily placed of the hook, nail, or other implement used to support the picture in the wall. With the wire in place over the hook, the device is then removed as illustrated in FIG. 8. An upward pull on the string, 104, causes the end adjacent the picture to slide upward as the device rotates substantially around the notch, 118. Because of the oval shape of the device, this upward movement reduces the distance which the wire is held away from the picture, releasing the tension on the picture wire. With the tension fully released, the device is extracted from behind the picture by lifting it out with the string. When used with a heavy picture, it may be desirable to support some of the weight of the picture by supporting the picture itself before removing the device.

The oval shape of the device assures that sliding the end adjacent the picture either upward or downward results in a decreasing radius relative to the notch. Ideally, the device would be positioned horizontally and movement in either direction will have this effect, decreasing the tension and releasing the device. The smooth contour of the sides opposite the notches further assures that the device will not snag or catch on the back of the picture. Alternative means of removing the device include reaching behind the picture and either pulling the device upward, or pushing it downward, releasing it in a similar manner to pulling on the string; or reaching behind the picture, grasping the device, and rotating it about its vertical axis, toward a position parallel to the picture, which also releases the tension on the wire.

Figure 9:
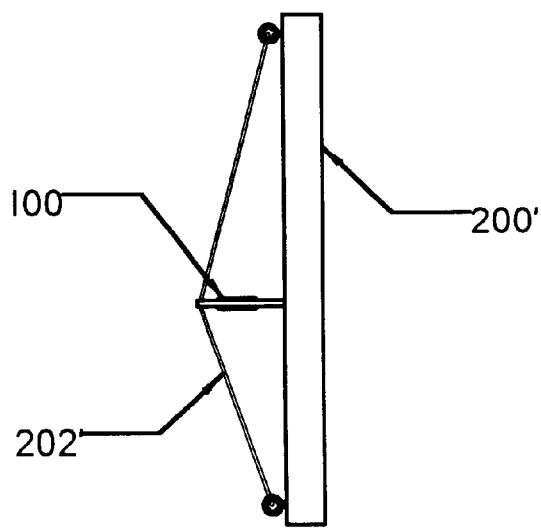
FIG. 9 illustrates the device in use with a smaller picture holding the picture wire, viewed from the top.
Figure 10:
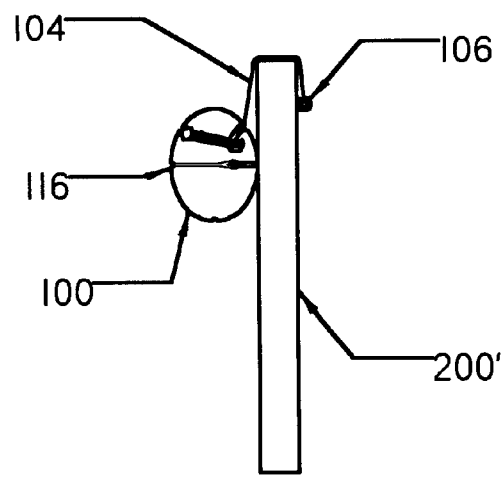
FIG. 10 provides a side view of the device in the same position as FIG. 9.

FIGS. 9 & 10 illustrate the utility of the oval shape in providing a second dimension relative to a notch. With a smaller picture, 200', notch, 116, is used to engage the picture wire, 202'. This provides a lesser distance across the device to the opposing edge, allowing the device to be inserted into a smaller gap between the picture and the picture wire. In all other respects the device is used as described above. If desired, the relative length of the major and minor axis of the oval can be varied during manufacture to vary the range to which the device is applicable. Further variation in the range of coverage can be provided by manufacturing the device in various sizes and provided separately or in packages containing more than one size.

PLUMB BOB ROLE

FIGS. 11–13 illustrate the inventive device being used as an adjustable plumb bob. Specific features discussed below can be more clearly seen in FIG. 1.

To use the device as a plumb bob, a portion of the string, 104, is unwound from the body, 102, of the device so that the free portion of the string is slightly longer than the side of the picture, 200, being hung. The string is then engaged in the hook, 112, to prevent further unwinding and to support the device. The tack, 106, is inserted into the wall so that the device hangs adjacent to the picture. If a tack is not included as part of the device, a separate tack, nail, pushpin or similar device may be used. Because of the light weight of the device, a very thin tack can be used and it need only be pushed slightly into the wall, This leaves a much smaller hole than would be needed if a conventional plumb bob were supported in a similar manner.

As described above, the inventive device functions differently than a conventional plumb bob. While many plumb bobs allow for storing the string by winding it around the weight, few, if any, allow for adjusting the length of the string. The height of the plump bob is typically adjusted by drawing the excess string upward, past the point where it is fixed or held, and letting it hang freely downward toward the plumb bob. This excess string can tangle or interfere with the task of visually comparing the support string with the item being checked (i.e. the picture). The present invention provides a conveniently adjustable length with no loose excess string to get in the way. FIG. 13 illustrates the device in use with a smaller picture, 200', and the length of the string adjusted accordingly.

Hole, 120 in FIG. 2, is alternatively provided to tie off the end of the string (by passing it through the hole and the opening 108, then knotting) to prevent the string from coming free of the body when the entire length of string is unwound. Further alternatives would include providing a small slit to capture the end of the string, using an adhesive to anchor the end, or using other methods well known in the art to secure the end.

In the preferred embodiment the hook, 112, is formed integrally with the opening, 110, provided for winding, or storing, the string. Alternatively, the hook could be provided at another location on the body, such as near one end aligned with the centerline so that the device hangs straighter, without altering the functioning of the device. A further alternative would also provide a means for storing the tack attached to the body. This could be a hole adapted to fit closely around the shaft of the tack, a slit which flexes to allow the point of the tack to be inserted, a tab under which the head of the tack may be placed, or any similar mechanism. Where the body of the device is sufficiently thick, inserting the point of the tack into such a holding mechanism would further protect the user from contact with the sharp end of the tack.

MATERIALS

The preferred embodiment of the invention utilizes plastic as the body of the device, conventional sewing thread as the string, and a conventional plastic head pushpin as the tack. Clearly alternative materials are applicable. Wood, metal, cardboard, and even heavy paper have been found to perform adequately and provide different appearances, manufacturing advantages and various price and durability options. The string can be made of almost any material capable of supporting the weight of the body while hanging substantially straight. Cotton string, mono-filament fishing line, and various forms of cording are also candidates. The optional tack may be almost any item which could be stuck into a wall: thumbtack, pushpin, nail, etc.

In mass production, it should be possible to manufacture the device and offer it for retail for a very small amount. This makes it available for a broad population which is unlikely to purchase a conventional plumb bob, spirit level, or more expensive picture hanging aid.

ALTERNATIVE EMBODIMENTS

If desired, the opening, 108, for string winding and notch, 116, for engaging the picture wire can be combined into a single indentation or opening in the side of the body. As long as the quantity of string wound around the body does not completely fill the notch, it will still be able to engage the picture wire.

In place of the tack, other means of removably attaching the free end of the string to the wall can be used. Removable adhesive, a hook using removable adhesive, a magnet (for metal walls) or a suction cup (for windows or glass partitions) are all candidates.

While the preferred form of the invention has been disclosed above, alternative methods of practicing the invention are readily apparent to the skilled practitioner. The above description of the preferred embodiment is intended to be illustrative only and not to limit the scope of the invention.

I claim:

1. A picture hanging aid to assist in hanging a picture and subsequently aligning the picture vertically, said aid comprising:
    a) a substantially flat body having a continuously curved edge;
    b) a string having proximal and distal ends, said proximal end attached to said body;
    c) said body defining plural openings in said edge adapted to receive said string when wound around said body;
    d) a hook adapted to engage said string when partially unwound and prevent further unwinding, said hook being defined by the shape of one of said openings, said opening defining said hook being defined as a continuous curve having central portion and a closed distal end, wherein said central portion is at a greater distance from said edge than said closed distal end.

2. A picture hanging aid to assist in hanging a picture and subsequently aligning the picture vertically, said aid comprising:
    a) a substantially flat body having a continuously curved edge defining an ovoid shape for said body;
    b) a string having proximal and distal ends, said proximal end attached to said body;

c) said body defining plural openings in said edge adapted to receive said string when wound around said body;

d) a hook adapted to engage said string when partially unwound and prevent further unwinding, said hook being defined by the shape of one of said openings.

3. The picture hanging aid of claim 2 wherein said ovoid has major and minor axes, each having two ends, and further comprising a notch adapted to engage a picture wire, said notch positioned substantially at one end of the major axis.

4. The picture hanging aid of claim 3 further comprising a second notch positioned substantially at one end of the minor axis.

5. A picture hanging aid to assist in hanging a picture and subsequently aligning the picture vertically, said aid comprising;

a) a substantially flat ovoid body, said ovoid having major and minor axes, each having two ends;

b) a string having proximal and distal ends, said proximal end attached to said body;

c) said body defining plural openings in said edge adapted to receive said string when wound around said body;

d) one of said openings being defined as a continuous curve having central portion and a closed distal end, wherein said central portion is at a greater distance from said edge than said closed distal end;

e) a hook adapted to engage said string when partially unwound and prevent further unwinding, said hook defined by said continuously curved opening;

f) a first notch adapted to engage a picture wire, said notch positioned substantially at one end of the major axis, and g) a second notch adapted to engage a picture wire, said notch positioned substantially at one end of the minor axis.

6. The picture hanging aid of claim 5 further comprising means for removably attaching the distal end of said string to a wall.

7. The picture hanging aid of claim 6 further comprising means for attaching said means for removably attaching to said body.

8. A picture hanging aid to assist in hanging a picture having a support wire, said aid comprising:

a) a substantially flat egg-shaped body, said body having a wide and a narrow end;

b) said body defining a first notch adapted to engage the support wire, said notch substantially at the apex of said wide end.

* * * * *